United States Patent [19]

Titov et al.

[11] Patent Number: 5,964,913
[45] Date of Patent: Oct. 12, 1999

[54] METHOD OF MAKING A VITREOUS MATERIAL

[75] Inventors: Nikolai Fydorovich Titov; Sergei Vladimirovich Polyakov; Vitaly Romanovich Barabash; Alexander Georgievich Kolesnikov; Alexander Ivanovich Golovchenko; Pavel Vladimirobich Polyakov, all of Volgogard; Valerian Markovich Sobolev, Moskow Region; Vasilly Sergeevich Skachko, Volgogard, all of Russian Federation; Roy Donald Baldwin, Dublin, Ohio; Igor Mikhailovich Dunaev; Boris Petrovich Burylyov, both of Krasnodar, Russian Federation

[73] Assignee: Dynelec Corporation, Columbus, Ohio

[21] Appl. No.: 08/934,410

[22] Filed: Sep. 19, 1997

Related U.S. Application Data

[63] Continuation-in-part of application No. 08/617,620, Mar. 18, 1996, abandoned.

[51] Int. Cl.⁶ .............................. C03C 15/00; C03B 5/02; C03B 5/027
[52] U.S. Cl. ......................... 65/135.6; 65/135.7; 65/30.1; 205/358; 205/769
[58] Field of Search .................. 65/30.1, 135.6, 65/135.7; 205/769, 358

[56] References Cited

U.S. PATENT DOCUMENTS

| | | |
|---|---|---|
| Re. 29,464 | 11/1977 | Loukes . |
| 1,955,451 | 4/1934 | Blau ........................................... 204/19 |
| 3,505,049 | 4/1970 | Plumat . |
| 3,622,295 | 11/1971 | Loukes et al. ............................. 65/30 |
| 3,656,927 | 4/1972 | Lawrenson . |
| 3,902,882 | 9/1975 | Loukes . |
| 4,759,787 | 7/1988 | Winterburn .............................. 65/30.1 |
| 4,874,417 | 10/1989 | Winterburn ................................ 65/111 |
| 4,983,255 | 1/1991 | Gruenwald et al. ..................... 156/643 |
| 5,096,479 | 3/1992 | Allen et al. ............................... 65/30.1 |
| 5,491,116 | 2/1996 | Beall et al. ............................... 65/33.1 |

Primary Examiner—Stanley S. Silverman
Assistant Examiner—Jacqueline A. Ruller
Attorney, Agent, or Firm—Mueller and Smith LPA

[57] ABSTRACT

The invention relates to a single phase vitreous material and to its production from a melt of a glass-forming multi-component feed mix. The process includes the preparation of a single phase melt in which there are mobile cations from a glass forming feed mix. The melt in passed in contacting relationship with and sequentially between devices made of low electrical resistance material from device to device. These devices are in and complete with the melt and a direct current voltage source an electric circuit. A voltage is regulated in the electrical circuit so that a direct electrical current is created in it and the concentration of the mobile cations in the melt is lowered thereby with reduction on the cathode of the metals of the same kind as the mobile cations. The melt, lowered concentration of the mobile cations, is cooled to produce the material as a structural article. In another embodiment, the anode is separated from the melt by a medium which is substantially inert with respect to the melt. A voltage in this electric circuit is regulated to create an electrostatic field between the cathode and anode so that a direct electrical current is created, and thus the concentration of mobile cations in the melt is lowered with reduction on the cathode of the metals of the same kind. This melt similarly is cooled to produce the material as a structural article. In another embodiment, the embodiments of both the electric circuit with the anode contacting with the melt and the electric circuit with the anode not contacting the melt are practiced simultaneously.

84 Claims, 4 Drawing Sheets

METHOD OF MAKING A VITREOUS MATERIAL

CROSS-REFERENCE TO RELATED APPLICATIONS

This application is a continuation-in-part of application Ser. No. 08/617,620 filed Mar. 18, 1996, now abandoned, the disclosure of which is expressly incorporated herein by reference.

STATEMENT REGARDING FEDERALLY SPONSORED RESEARCH

Not Applicable.

BACKGROUND OF THE INVENTION

Presently, the glass making industry produces a wide range of glass articles. Glass, as a variety of an amorphous state of the substance produced from the melts of natural minerals and synthetic substances, has unique properties and application of materials other than glass in some technologies is impossible. Glass is a special system comprising different oxides of metals of $Me_2O$, $MeO$, $Me_2O_3$, $MeO_2$, $Me_2O_5$, and $MeO_3$ type (where Me represents a "metal"). In place of oxygen, there can be fluorine, chlorine, or elements which have similar physicochemical properties. The traditional pattern of glass production is realized by sequentially conducting a finite series of physicochemical processes:

$$T^1, T^2, \ldots, T^{n-m}, \ldots, T^{n-1}, T^n \qquad (1)$$

where:

n and m are integers;

1≦m<n.

The enlarged classification of these processes can be represented in the form of the following technological operations:

a) preparation of a glass-forming starting mixture from natural and/or synthetic substances;

b) heating of the starting mixture to a temperature required for a complete transition of the components of the mix into a melt with the formation of a new substance;

c) cooling of a thus-obtained substance which is in the state of a melt to a temperature necessary for the shaping of the articles; and d) thermal or other treatment of the articles aimed at obtaining desired physicochemical properties;

A finite series of physicochemical processes $$T^1, T^2, \ldots, T^{n-m} \qquad (2)$$

by the action of force fields (mechanical, thermal, electrical, and those fields similar in their action) when completed, result in the obtaining of a substance which is a structural compound in the state of a melt which exhibits the properties of an electrolyte, regardless of whether the starting substances exhibited the properties of an electrolyte.

In the obtained substance two constituent parts can be distinguished. One of these parts is a relatively immobile part and is, on the whole, a monostructure which is three-dimensional and practically continuous within the confines of a real body in the form of a lattice (geometric representation), which is characterized by a negative charge (the term "practically" means that in the lattice there are spaces not occupied by lattice-forming atoms). The other part of the structural compound is an active and mobile part relative to the first part and consists of randomly distributed ions of metals that, traveling under the action of a thermal field, establish groups or associations and each ion (having a positive charge) has a separate ionic bond with the relatively immobile part.

A finite series of physicochemical processes $$T^{n-m}, \ldots, T^{n-1}, T^n \qquad (3)$$

terminate by obtaining the material called glass having physicochemical properties defined by the state and chemical composition of the melt at the moment of its solidification.

As in a melt, two constituent parts in the glass can be discerned. The lattice of the glass, as a whole, is practically a single-whole three-dimensional structure in which there are cations mobile only in the volume occupied by a group of cations, and in the case when the temperature is sufficiently high, the cations move from one group into another without disrupting the continuity of the lattice of the glass. The chemical elements, which are represented by mobile cations, do not form structural groups with oxygen (fluorine, chlorine, and those elements similar to their physiochemical properties).

The lattice is the basis of the glass and defines its properties. A glass consisting of only chemical elements forming the lattice (one-component systems, e.g., quartz glass) has the most desirable and best glass properties from the standpoint of temperature resistance and structural strength. Groups of cations, when they exist in the lattice (multi-component systems, e.g., silicate glasses), only diminish the properties of glass and normally are introduced into the glass composition in order to obtain technical characteristics of the glass acceptable to the user at the lowest production cost. The advantages of one-component glass are generally known. Technical characteristics of one-component glass permit a reduction in the weight of the end product and permit the use of glass articles in difficult operating conditions. Only the high price of articles made of one-component glass hinders its wide application.

Among the one-component systems, quartz glass has the properties required for a wide variety of applications. This hard material is characterized by a whole set of important performance properties, such as: high strength, hardness, wear resistance, thermal endurance, stability to attack of corrosive media, and excellent optical properties.

Presently, industrial quartz glass with corresponding high technical characteristics is manufactured by only a few methods: electrothermal, gas-flame, plasma, and steam-phase. These methods of manufacturing such glass, however, are labor intensive and expensive because they require high melting temperature (1550° C. or higher) of the starting mix and a lengthy process of heat treatment.

The most rational and economic way of solving this problem is to produce a multi-component system characterized by low melting temperatures of the starting mix and then to remove the mobile part therefrom. Vicor® brand and Pyrex® brand quartz glasses find the widest application in industry today. These glasses have characteristics comparable to those of quartz glass at lower production costs.

The specific chemical composition of the starting mix used for production of Vicor® glass does not require heating to high temperatures to establish the starting melt. A special method of removing the active mobile part from the melt is employed in the production of this glass. Two phases with interpenetrating weakly bonded structures are formed in the process as the melt is supercooled. One of the phases is removed by acid. The balance is a brittle, cellular, one-phase vitreous material with 96% content of silicon oxide. At the end of the technological cycle, the material is subjected to thermal treatment at a temperature where the material passes into a flowable state, thus forming a non-porous transparent glass comparable in its properties with quartz glass.

Pyrex® glass also is produced from a starting mix of a specific chemical composition having a low melting temperature, but with one of its phases represented as drops of liquid which are removed chemically with great difficulty. Since such a drop is isolated by the other phase/lattice and has practically no structural bond with it, the mechanical strength and other properties of such glass are defined by the properties of the phase/lattice which consists mainly of silicon dioxide.

The methods of manufacturing one-component glasses by use of traditional manufacturing techniques are applicable if the starting mix has a specific chemical composition. Such methods are labor intensive and/or costly due either to their high melting temperature (e.g., production of quartz glass), or because of the increased number and complexity of technological operations (e.g., production of Vicor® glass). It is evident that the method of removing the active mobile part of the glass directly from a multi-component low-temperature melt making use of the fact that the melt has the properties of an electrolyte will have the greatest effect. In such a process, there is the possibility of producing a glass/lattice in the form of material possessing improved technical characteristics compared to glass obtained by ordinary methods from the starting multi-component mix. It, also, is evident that such a method is applicable to the multi-component melt of the starting mix of practically any glass-forming chemical composition in which two constituent parts are present.

BRIEF SUMMARY OF THE INVENTION

The present invention produces a single-phase vitreous material in an electrochemical process directly from a melt in which two constituent parts can be distinguished. This melt is prepared from a glass-forming multi-component feed mix of practically any glass-forming chemical composition. Such an object is achieved by sequentially conducting a finite series of physicochemical processes:

$$T^1, T^2, \ldots, T^{n-m}, \ldots, T^{n-(m-1)}, T^{n-(m-2)}, \ldots, T^{n-(m-k)}, \ldots, T^{n-1}, T^n \quad (4)$$

where:
n and m are integers;
$1 \leq m < n$;
$1 \leq k < m$.

the majority of which are carried out by methods that are conventional for the glass making industry.

For present purposes and in accordance with accepted terminology, a "structural compound" is neither a physical nor a mechanical mixture of components but is a particular type of a true solution. It is an indeterminate chemical compound representing a complex system in which two constituent parts can be distinguished: one part is unchangeable (principal part) and the other part is changeable (secondary part). The principal part is understood to be the part of the structural compound, a change of which part will lead to a change of the compound as a whole. The changeable part, to the contrary, can be subjected to changes and experience replacement. In order to identify only the constituent parts of a structural compound, they are denoted by letter symbols:

A—unchangeable (principal part);
B—changeable part;
C—structural compound.

Structural Compound, C, can then be represented by two letter symbols: AB.

1.0 The physicochemical processes $$T^1, T^2, \ldots, T^{n-m} \quad (5)$$

take place when:

1.1 for obtaining the constituent parts unchangeable (principal) A and changeable B of Structural Compound C, appropriate components—feed chemical compounds (e.g., $Na_2O$) or starting components (e.g., $Na_2CO_3$) containing feed chemical compounds, and possible additional components (e.g., accelerators of physicochemical processes)—are mixed homogeneously in the amounts required to prepare either the feed or the starting glass-forming multi-component mix (subsequently simply either feed mix or starting mix) of the prescribed chemical composition;

1.2 the components of the feed mix identified in Structural Compound C as Part A are characterized by chemical elements entering into the composition of the starting chemical compounds and which have a valence of 3 and higher and the cations of which have a high charge (e.g., $P^{5+}$, $V^{5+}$, $Si^{4+}$, $Ti^{4+}$, $Zr^{4+}$, $Ge^{4+}$, $B^{3+}$, $Al^{3+}$, $Fe^{3+}$, and those crystallochemically similar to them) or which have a valence equal to 2 and the cations of which have a charge equal to 2 (e.g., $Fe^{2+}$, $Co^{2+}$, $Ni^{2+}$, $Pb^{2+}$, $Cd^{2+}$, $Zn^{2+}$, $Be^{2+}$, and those crystallochemically similar to them), and which form, in combination with the elements in Groups VI–VII of the periodic table e.g., with oxygen), stable coordination polyhedrons of the type $[MeO_n]$;

1.3 the components of the feed mix identified in Structural Compound C as Part B are characterized by a) chemical elements entering into the composition of the starting chemical compounds and which have a valence of 1 and the cations of which have a charge of unity (e.g., $Li^+$, $Na^+$, $K^+$, and those similar to them in their physical and chemical properties) or those chemical elements which have a valence equal to 2 and the cations of which that have a charge equal to 2 (e.g., $Ca^{2+}$, $Sr^+$, $Mg^+$ and those cations similar to them in their physical and chemical properties); and b) chemical elements entering into the composition of the starting chemical compounds which have a valence equal to 2 and the cations of which that have a charge equal to 2 (e.g., $Pb^{2+}$, $Cd^{2+}$, $Zn^{2+}$, $Be^{2+}$, and those cations similar to them in their physical and chemical properties), in the case where they do not form, in combination with the elements of Groups VI and VII of the periodic table (for example, oxygen), stable coordination polyhedrons of the $[MeO_n]$ type;

1.4 the feed mix prepared from the components identified in items 1.2 and 1.3 is heated to a temperature at which each component of the starting mix passes into a melt;

1.5 the components of the starting mix lose their individuality in the melt and form Structural Compound C in which a) Part A is either, on the whole, a monostructure which is three-dimensional and practically continuous within the confines of a real body and which is characterized by a negative charge and can be geometrically visualized in the form of a lattice, or consists of individual macroparts having a negative charge, or consists of macroparts bonded between themselves in either one or in two or in three directions into a monostructure having a negative charge (the term "practically" means that in the lattice there are spaces not occupied by lattice-forming atoms), and b) Part B, active and mobile relative to Part A, consists of randomly distributed ions of metals in Part A that, traveling under the action of a thermal field, establish groups or associations and each ion (having a positive charge) has a separate ionic bond with Part A.

The melts formed from the starting components identified in items 1.2 and 1.3 represent a new state of the starting components of each melt and exhibit the properties of the electrolyte and conduct electric current by their ions and electrons, or only by ions, and have two discernible constituent parts, viz., Parts A and B, each of which has carriers of electric charge of the opposite sign distributed in the bulk which makes it possible to organize physicochemical processes for the transfer of the carriers in the required direction by an electric field.

2.0 The physicochemical processes $$T^{n-m}, \ldots, T^{n-(m-1)}, T^{n-(m-2)}, \ldots, T^{n-(m-k)} \qquad (6)$$

are implemented in a melt under the action of:

(a) a thermal field which causes thermal diffusion of positively charged mobile Part B in the bulk of the melt and, also, leads to an intermediate state of Part A which state is a consequence of the breakage and formation of the chemical bonds, and differs from the initial state of Part A by the presence of a negative charge carrier, which at the moment of formation of the intermediate state of Part A has electrons which can have, just as the excess electrons, together with which Part A is characterized by a negative charge can have, an energy greater than the energy of other electrons which belong to the chemical elements of Part A, and (b) electric and electrostatic fields, or their combination, which prescribe a direction of the charge carriers' movement in the process of thermal diffusion, and lead to their orientation and/or displacement and to the detachment of electrons with a larger energy from the negative charge carriers of the intermediate state of Part A of the melt, and, also, lead together with the action of the thermal field, to a change of the concentration of the active mobile Part B in the melt, its removal from the melt, or its partial removal with or without formation of surplus positive charge in the remaining part of the melt, and accordingly, Part A of the melt can be expressed by the following general formula:

$$SMe^q_m V^k_n,$$

where:

$Me^q$ are the chemical elements identified in Item 1.2;

$V^k$ are chemical elements in Groups VI—VII of the periodic table, in particular, oxygen.

and accordingly, Part B of a melt can be written by a formula as follows:

$$SMe^p_f,$$

where:

$Me^p$ are the chemical elements identified in Item 1.3.

The physicochemical processes (6) modify the melt in such a manner that the homogeneous system represented by Structural Compound C of the general formula:

$$SMe^p_f Me^q_m V^k_n,$$

transitions into the heterogeneous system consisting of at least two phases:

one phase is modified Part A of Structural Compound C which can have a surplus positive space charge; and another phase is modified Part B of Structural Compound C.

The transformation of the homogeneous system into the heterogeneous system consisting of at least two phases can take place according to a pattern as follows:

$$SME^p_f Me^q_m V^k_n \rightarrow rMe^p_f + (S-r)Me^p_f Me^q_m V^k_n$$

where:

$rMe^p_f$ is the modified Part B of structural compound C and at the same time the neutralized cations identified in Item 1.3;

$(S-r)Me^p_f Me^q_m V^k_n$ is the modified structural compound C after the removal of the mobile cations in the amount of $SMe^p_f - rMe^p_f$ and is identified in items 1.2 and 1.3 in the form of monomolecular compounds which may have a surplus positive space charge;

i, j, f, m, n are integers; and r, S>0 are real numbers.

3. The physicochemical processes $$T^{n-(m-k)}, \ldots, T^{n-1}, T^n \qquad (7)$$

are characterized by the reconstruction of chemical bonds in a high-viscosity melt after the removal of the active mobile part by the thermal, electrical, and/or electrostatic (and those similar to their action) fields and by cooling of the melt and are implemented by methods and equipment used in the glass industry for obtaining vitreous material as a structural article.

In summary, an embodiment of the invention relates to a method for producing a material from a melt of glass-forming multi-component feed mix with application of an electrochemical process. The process steps of one embodiment commence with the formation of a melt of the feed mix, which melt consists of two constituent parts (as they are described above) and in which cations of univalent and/or divalent metals are dispersed. Next, devices are provided, at least one being an anode and at least being a cathode. A direct current then is passed between an anode and a cathode. The melt is passed in contacting relationship with and sequentially between the anode(s) and the cathode(s) to lower the concentration of the cations of metals (identified in Item 1.3) in the melt. The melt is cooled to produce said material. Note: In this application, the term "(s)" is used to indicate the optional plural state of the item with which the (s) term is used.

In another embodiment of the present invention, the melt is passed in contact with a cathode. There is an anode made from low electric resistance material which is suspended over and separated from the melt by a medium that is inert (absolute inertness is not required) with respect to this melt (e.g., a gas, a vacuum, or the like). A voltage is impressed between the cathode and the anode to form an electrostatic field, with the formation of a direct current in an electric circuit of a cathode, a melt, a medium, and an anode, whereby the concentration of the cations of said metals in the melt is lowered.

In yet another embodiment of the present invention, the melt is subjected to a direct electric current in electric circuits of an anode in contact with the melt and an anode not in contact with the melt (by the action of an electric field and an electrostatic field, respectively). In this embodiment, the cathode of one electric circuit also is the cathode of the other electric circuit. The cathodes in all three embodiments can be solid (e.g., graphite or platinum) or liquid (e.g., molten tin) and dissolving said metals or metals of the same kind as the cations being removed from the melt. The choice of cathode material, as well as that of the other materials or equipment depends on the specific conditions of application of the invention.

The obtained melt with a changed concentration of the components can be cooled sufficiently to produce a "structural article". By "structural article" is meant a real physical body having of a three-dimensional structure produced in said melt by means of an electrochemical process with the use of the present invention. The article may be an intermediate product or may be the final product in its ultimate configuration. Depending upon the employed regimen of cooling the melt with a changed concentration of component (s), the structural article may be glass-crystalline or glass (amorphous state of material), as those skilled in the art will appreciate.

The nature, principles, details, and equipment of the method will be more clearly apparent from the following detailed description with examples constituting the embodiment of the invention with reference to the accompanying drawings.

The drawings will be described in detail below.

DETAILED DESCRIPTION OF THE INVENTION 4.0 To produce the inorganic vitreous material (in the amorphous or crystalline state) of fused oxides (fluorides and the like) of high valent metals from a melt of a starting mix having the chemical composition required for the formation of prescribed Structural Compound C, it is necessary, according to the invention, to continuously conduct the physicochemical processes (4)

$$T^1, T^2, \ldots, T^{n-(m-1)}, \ldots, T^{n-(m-1)}, T^{n-(m-2)}, \ldots, T^{n-(m-k)}, \ldots, T^{n-1}, T^n$$

which occur in a technological cycle (including the technological operations from obtaining and preparation of the starting mix components to producing the end material) that can be divided into three groups of below-stated technological operations:

a) obtaining of Structural Compound C based on the principles of thermochemistry;

b) changing the concentration of mobile cations of Part B in the melt by the action of a combination of thermal and electric and/or electrostatic fields (and fields similar to their action) with removing of the cations of Part B from the melt (or partial removal) with or without the formation of surplus positive charge in the remaining part of the melt; and (c) producing an inorganic vitreous material as an end product, or to produce the material as an intermediate product to subsequently fabricate structural articles required by a user, or to directly produce these articles by shaping during cooling of the melt consisting of the chemical elements identified in items 1.2 and 1.3, and simultaneously obtaining the metals identified in Item 1.3 either as a product, or to subsequently oxidize the metals to obtain the components of the starting mix, with recovery of heat released in the process of oxidizing of the metals.

For the embodiment of the invention, the technological cycle of producing the inorganic vitreous material is implemented by known methods and equipment used in the glass industry with modifications and additions necessary for organizing the electrochemical process in the melt and implementing (b) in Item 4 of the technological operations.

Figure 1:
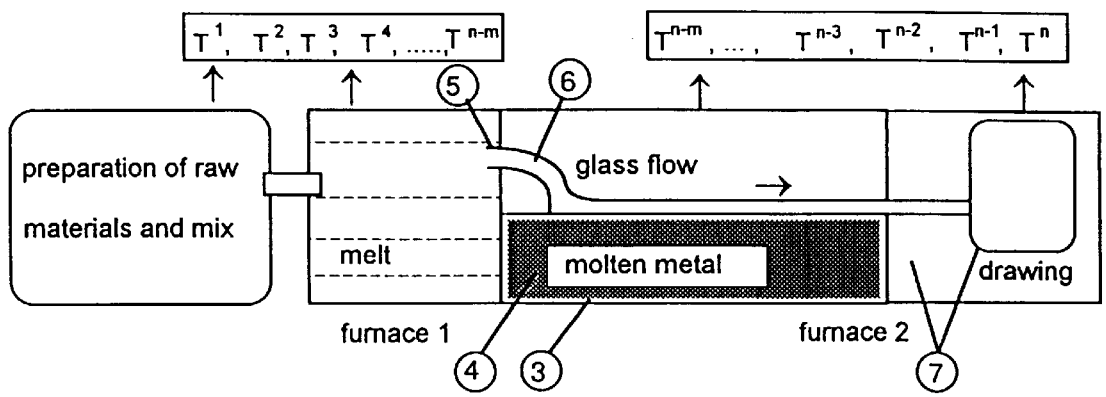
FIG. 1 is a schematic of a conventional float glass process.

The difference between the present method and its equipment, and known methods of producing vitreous material (as structural material, or as glass, or as glass-crystalline material), as well as the use of known methods and equipment, will be further understood by an examination (as an example) of the use of the method and equipment for producing float glass (FIG. 1). The use of other known methods and equipment, as well as the necessary changes for the embodiment of the invention, will be self-evident to those who are skilled in the technology of glass or glass-crystalline material production.

The production of float glass is realized by sequentially conducting a finite series of physicochemical processes (1):

$$T^1, T^2, \ldots, T^{n-m}, \ldots, T^{n-1}, T^n$$

including a finite series of physicochemical processes (2)

$$T^1, T^2, \ldots, T^{n-m}$$

with the use of generally known equipment for obtaining and preparing the components of the feed mix, preparing the feed mix, charging the feed mix in batches or continuously into furnace 1, heated to the working temperature intended for obtaining a melt of the feed mix, and a finite series of physicochemical processes (3)

$$T^{n-m}, T^{n-1}, T^n$$

implemented by methods and equipment including furnace 2, in which there is a device 3 with molten metal 4 serving the purpose of polishing, and the temperature conditions in this furnace make it possible to change the viscosity of the feed-mix melt to a viscosity permitting the creation of a geometrical shape of the sheet, and in addition furnace 2 is joined with furnace 1 and there is a device 5 for the transfer of feed-mix melt 6 from furnace 1 into furnace 2 onto the molten metal 4 and moreover, furnace 2 is joined with special auxiliary equipment 7 for the drawing and cooling of the formed glass sheet.

In the present invention, obtaining a melt means obtaining a substance when every component of the feed mix will have gone into the melt and when the components will have completely reacted with each other with the formation of a substance. Since the chemical composition of the substance changes in accordance with the desired final goal of obtaining the physical or chemical properties of the material of the invention, it is not feasible to give exact chemical compositions for all the substances (accordingly, for all the feed mixes). Therefore, the substances in general are called a Structural Compound, the definition and characteristics of which are given above in accordance with this in order to make it clear what chemical compositions of materials are materials of the invention and so that the process of obtaining the materials of the invention can be understood. For the reason given above, it is not feasible either to give exact temperatures and other parameters (e.g., the imparted voltage) of the materials of the invention. The parameters will change in accordance with the equipment chosen and the specific chemical composition of the material of the invention.

The process of obtaining the Structural Compound (which according to the invention is equivalent to obtaining the substance or the melt) is the same for and precedes the conduct of the electrochemical process either in a classical electrochemical cell with the action of an electric field or in an electrochemical cell with the action of an electrostatic field or in an electrochemical cell with the action of both said fields and with those characteristics, which are necessary for obtaining the material of the invention. Also the same after and for all 3 cases of the electrochemical process is the process of cooling with obtaining of the material or of those structural articles, which are analogous to the structural articles usually produced in the glass industry. Since in the 3 independent methods identical processes exist, it has been deemed advisable to formulate the text below in such a way that the process of obtaining the Structural Compound is described once for all 3 cases of the electrochemical process, after which each case of the electrochemical process is described, and once the process of cooling with obtaining the material or structural articles is described.

4.1 Producing Structural Compound C.

According to the invention, in order to obtain the Structural Compound C a finite series of physicochemical processes (5)

$$T^1, T^2, \ldots, T^{n-m} \qquad (5)$$

must be carried out, which are implemented by methods and equipment customarily used in the glass industry, including the float process, for obtaining a melt, and are properly chosen in accordance with what has been described and can be understood from what has been said above. In FIGS. 1, 2, 4, and 6, the finite series of physicochemical processes (5) is indicated by arrows from the equipment necessary for implementing this finite series. In these figures, the furnace for obtaining the melt is labeled number 1, while the other necessary pieces of equipment (e.g., for preparing and charging the feed mix) are not labeled by numbers. In addition, in the present invention the finite series of physicochemical processes is characterized by the fact that 4.1.1 The feed mix is prepared from the components required to obtain Structural Compound C and formed according to Item 1.3 above and represented:

by oxides of univalent or bivalent metals or a mixture of oxides of univalent and/or bivalent metals, by fluorides of univalent or bivalent metals or a mixture of fluorides of univalent and/or bivalent metals, or by bromides of univalent or bivalent metals or a mixture of bromides of univalent and/or bivalent metals, and formed according to Item 1.2 and represented:

by fluorides of metals having higher valence or a mix of such fluorides, by oxides of metals having higher valence or a mix of such oxides or by bromides of metals having higher valence or a mix of such bromides, and accordingly, the components of the starting mix can be represented by other chemical compounds of metals with the elements in Groups VI–VII of the periodic table as well as by the salts or mixture of salts (for example, carbonates, sulfates, nitrates, and phosphates), and thus, the mix to the present process can be supplied as a starting mixture of salts or other compounds that are converted into the feed mix.

4.1.2 The prepared feed mix is charged either periodically or continuously into furnace 1 heated to the temperature of formation of Structural Compound C, the chemical composition of which can be represented by the following general formula:

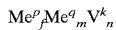

$$Me^p_j Me^q_m V^k_n$$

4.1.3 The components of the starting mix charged into furnace 1 react with each other and are modified in physicochemical processes in such a manner that the starting mix components identified under Item 4.1.1 and formed as described under Item 1.3 above, and the starting mix components listed under Item 4.1.1 and formed as described under Item 1.2 above, pass into the melt, and the resulting product of the reaction is Structural Compound C, in which can be distinguished the ionically bonded constituent Parts A and B,—a new state of the starting components.

4.2 The Change Of Concentration Of Part B And Its Removal From Structural Compound C.

4.2.1 Change Of Concentration Of Part B In Structural Compound C In The Thermal And Electric Fields.

The melt, represented by Structural Compound C, exhibits properties of an electrolyte and is either forced or flows independently from furnace 1 into furnace 2 for the purpose of organizing in the melt an electrochemical process with equipment commonly used in a classical electrochemical cell.

In order to change the concentration of Part B by removing it from the melt, a finite series of physicochemical processes (6)

$T^{n-31\ m}, \ldots, T^{n-(m-1)}, T^{n-(m-2)}, \ldots, T^{n-(m-k)}$ constituting the electrochemical process (FIG. 6) is implemented in Furnace 2 which has the devices described above and in the sequence in which these devices are shown in FIG. 1 and with some changes shown in FIG. 6 and described as follows. Device 3, together with liquid metal 4 as is shown in FIG. 1, is device 9 in FIG. 2 and serves as the cathode in the electrochemical cell. Device 5 for transferring the melt onto liquid metal 4 as is shown in FIG. 1 is made of low electric resistance material and is device 8 in FIG. 2 and serves as the anode in the electrochemical cell. Melt 6 (in FIG. 2) is passed from furnace 1 into furnace 2 in contacting relationship with and sequentially between and from device 8 to device 9. Devices 8 (the anode) and 9 (the cathode) are in and complete with melt 6 and the direct current voltage source V1 an electric circuit in which by imparting a voltage a direct electric current is passed through melt 6 and in this manner the concentration of cations of Part B is lowered with their removal from melt 6 in the cathode processes common for the classic electrochemical cell, and in this case with dissolution of the metals of the same kind as the removed cations of Part B into liquid metal 4 (e.g., tin or lead) of device 9.

In regular electrochemical cells, the ions, as separate structural units which have no chemical (structural) bonding between themselves, on reaching the anode (cathode) and coming in contact with them, gain and give up electrons which converts them into a neutral state (neutral atoms or molecules) which then may either be liberated in the form of gas bubbles, or settle out in the form of particles, and/or be distributed in the starting electrolyte by thermal diffusion liberating a space near the anode (cathode) for new ions. The efficiency of an electrochemical process depends greatly on the rate of renewal of ions in the layer near the anode (cathode). The electrochemical process may cease, for practical purposes, if said layer is renewed poorly or is not renewed at all.

Above, it was noted that part of the structural compound is characterized by a negative charge and when the electrochemical process in the melt is carried out for the case in which this part is represented by a monostructure in the form of a three-dimensional practically whole lattice (matrix), the electrons transfer into the external electric circuit of the electrochemical cell from that part of the lattice which contacts the anode, and which, in giving off electrons, is neutralized with a simultaneous process of displacement and movement of the cations of Part B from the anode with the formation of an electrically neutral layer at the anode. (The term "practically" means that in the lattice there are volumes which are not occupied by lattice-forming atoms.)

This layer is not renewed in the usual manner as in the case of regular electrolytes. It is renewed by a prolonged redistribution of the atoms and ions combined into a common lattice, and as a result for all practical purposes terminates the electrochemical process and the electric current in the electric circuit in the range of values of the imparted voltage that does not cause decomposition of this layer. This electrically neutral layer consists of chemical elements that form Part A as described above (e.g., silicon oxide, aluminum oxide, etc.). It is known that the electric current in a medium consisting of, for example, silicon oxide and substances similar in their electric properties is not formed if there is no decomposition of substance into its elementary components in the form of ions (e.g., $O^-$ and $Si^{30}$), which is not the purpose of the invention.

The problem of renewing a layer near an anode also is not resolved even in the case when the proper selection of the chemical composition of the starting components produces the structural compound with Part A consisting of macroparts spatially separated in the bulk of a melt. The macroparts, being individual anions, will migrate as in a regular electrolyte to an anode and become neutralized when coming in contact with it. The neutralized macroparts, being in thermal movement, come in contact with each other, and combine into a practically single electrically neutral layer which impedes the neutralization of new macroparts-anions which accumulate in the bulk depleted of cations and which, also, come in contact and combine with each other and join the electrically neutral layer, leading to the termination of the electrochemical process in the same manner as in the case with the process with a Structural Compound C having Part A as a three-dimensional practically whole lattice.

Figure 2:
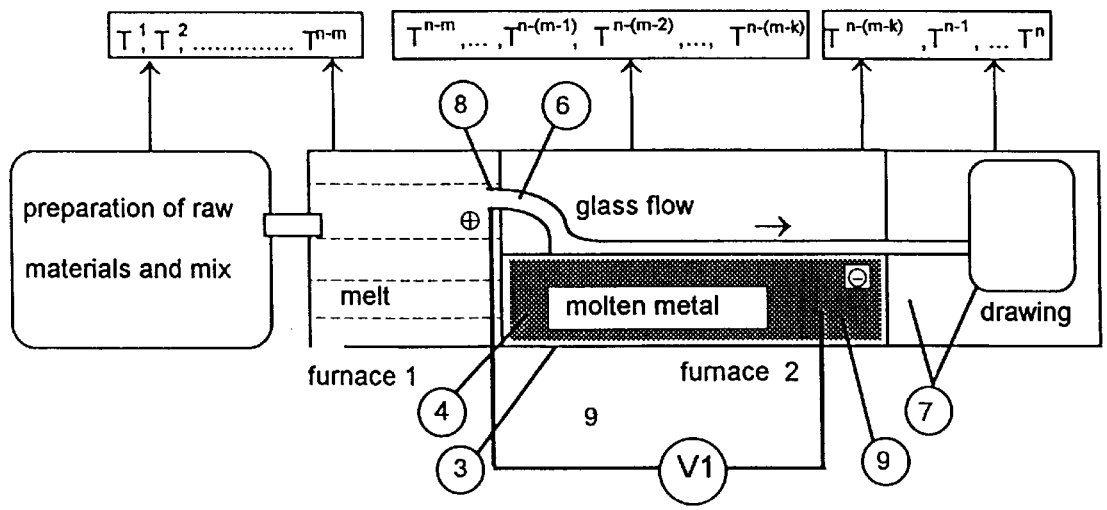
FIG. 2 is a schematic of the float glass process wherein an electric field is used to organize an electrochemical process in accordance with the present invention.

In the melt being transferred from furnace 1 through a region at the surface of the anode onto the cathode (device 9) in furnace 2 as shown in FIG. 2, there occurs a combination of physicochemical processes leading to a continuous electrochemical process and a stable effective direct current in the range of the imparted voltage which does not lead to decomposition processes of Part A at the anode. In the electric circuit of such an electrochemical cell, the cations of mobile Part B are efficiently removed from the melt.

During the movement of the melt across anode 8, there occurs continuous renewal of the layer contacting with the anode and constantly new parts of the lattice come in contact with the anode giving up electrons, and, thus, into the outer electric circuit of the electrochemical cell electrons are continuously transferred, which leads to formation of a stable electric current and electrochemical process with anode-cathode processes with conduction in the melt by electrons and cations, with the obtaining of substances formed by neutralized cations of the same kind, and substances which are represented by the chemical elements of Part A.

Figure 3:
FIG. 3 shows a curve of a typical volt-ampere characteristic of the electrochemical process.

In FIG. 3, the curve of a typical volt-ampere characteristic of the electrochemical process for a multi-component system is shown. The process of neutralization of charge carriers on the cathode whose magnitude, charge sign, and nature are the same (cathode processes include the processes of disassociation and transport) and/or the process of neutralization of the charge carriers on the anode whose magnitude, charge sign, and nature are the same (anode processes include the processes of disassociation and transport), are characterized by their own volt-ampere characteristic and by a limiting value of the current whose magnitude can change upon full completion of an anode (and/or cathode) process or upon completion of one anode (and/or cathode) process and the beginning of another anode (and/or cathode) process due to the presence in the melt of charge carriers of the same sign (positive or negative) but of different nature. The anode (and/or cathode) processes occur sequentially, starting from that process for which the limiting value of the current will be less than the limiting values of the current of other anode (and/or cathode) processes.

For the melt of the feed mix (prepared from the components identified in Items 1.3 and 1.2 above and as described under Items 4.1.1), the anode process in the electrochemical cell, characterized by the extraction of electrons from Part A, does not change during the entire electrochemical process since the magnitude, sign of the charge, and nature of the charge carrier does not change (Part A). In the electrochemical cell with a moving melt, a change of current is only possible with a change of the cathode processes if there is the presence of the cations of a different magnitude of the charge and/or of a different nature (the sign of the charge is the same). The limiting value of the current with a corresponding maximum and necessary voltage for one cathode process is achieved in the event of the appropriate surface area and configuration of the anode (cathode), speed of movement, and melt viscosity. The voltage is regulated to obtain a limiting value of the electric current for achieving the purpose of removing from the melt the desired cations of Part B.

Melt 6 in furnace 2 spreads out on liquid metal 4 (e.g., tin or lead). The spreading of the melt is not restricted and the melt does not come in contact with the walls (i.e., the melt lies freely) of the device containing the liquid metal which together with the liquid metal is the cathode (device 9) of the electrochemical cell. Since the melt spreads out freely, it has the maximum area of surface contact with the cathode which can be achieved. For specialists, there are evident and identifiable factors that will affect the spreading of the melt (i.e., chemical composition, viscosity, amount of melt, the amount that is applied to the liquid metal per unit time) in each specific case in order to take into account an important feature of the electrochemical process, which is the dependence of the electric current (respectively, the dependence of the efficiency of the electrochemical process) on the area of the anode and cathode. The cathode processes for melts of the feed mixes (prepared from the components identified in Items 1.3 and 1.2 above and as described in Item 4.1.1) are defined by objective physicochemical processes in the melt (i.e., by relatively high viscosity of the melt, which affects the diffusion of cations to the cathode). In fact, the cathode process is characterized by a process of neutralization of cations, which are near the cathode surface with an intensity of neutralization of cations proportional to the number of electrons removed from Part A on the anode.

The area of the surface of the anode(s) and cathode(s), the temperature (viscosity of the melt), the imparted voltage, the rate of movement of the melt, other process parameters, and the equipment, are determined in order to achieve the limiting value of the electric current in each case for a specific chemical composition of the feed mix, and consequently, these factors define the efficiency of removal of mobile cation of Part B from the melt and, according to the present invention, lead to the formation from the homogeneous system (that is, from the starting glass-forming single-phase multi-component melt) of the heterogeneous system which consists of at least two phases:

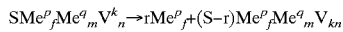

one phase $rMe^p_f$ is the modified Part B of Structural Compound C and is at the same time the neutralized cations identified in Item 1.3;

the other phase $(S-r)Me^p_f Me^q_m V^k_n$ is the modified Structural Compound C after the removal of the mobile cations in the amount of $SMe^p_f - rMe^p_f$ and is identified in items 1.2 and 1.3.

The equipment of an electrochemical cell and methods for organizing an electrochemical process with the application of the present invention for each specific case in practice will be different and with a different combination but must include the movement of the glass-forming melt in contacting relationship with and sequentially between and from device to device made of low electrical resistance material for the purpose of achieving renewal of the layer at the anode. In addition, among the devices there must be the essential elements of an electrochemical cell—at least one device must be the anode and one device must be the cathode incorporated into the electric circuit of a direct current voltage source.

4.2.2 The Change Of Concentration Of Part B In Structural Compound C In The Thermal And Electrostatic Fields The melt, represented by Structural Compound C, is either forced or flows independently from furnace 1 into furnace 2. Part A of the melt, characterized by the negative charge formed by excess electrons, has electrons which can have, just as the electrons at the moment of formation of the intermediate state of Part A can have, an energy greater than the energy of other electrons which belong to the chemical elements of Part A.

In order to change the concentration of the cations of Part B by removing them from the melt, a finite series of physicochemical processes (6)

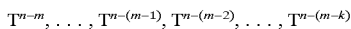

constituting the electrochemical process (FIG. 4) is implemented in furnace 2 which has the devices described above and in the sequence in which these devices are shown in FIG. 1 and with some changes shown in FIG. 4 and described as follows. The feed-mix melt is placed into furnace 2 through device 5 onto the liquid metal 4 (e.g., tin or lead), which together with device 3, is device 10 serving as a cathode in the electric circuit of the electrostatic field, the anode of which is device 11 made of material of low electric resistance and is separated from melt 6 by medium 13 (e.g., a gaseous one), which is inert with respect to melt 6. The cathode and the anode (devices 10 and 11, respectively) are joined by melt 6 and medium 13 in an electric circuit, which includes a direct-current voltage source 12 and in which, by imparting a voltage on said cathode and anode, an electrostatic field between them is created in such a way that the direct electric current created as a result of imparting the voltage is passed through the cathode (device 10), the anode (device 11), medium 13, and melt 6, and in this manner the concentration of the cations of Part B is lowered with their removal from melt 6 in the cathode processes common for the classic electrochemical cell and in this case with dissolution of metals of the same kind as the removed cations of Part B into the liquid metal 4 (e.g., tin or lead) of the cathode (device 10).

In furnace 2, the melt moves with or on liquid metal 4 in a direction that is perpendicular to the electrostatic field formed by the cathode and the anode (devices 10 and 11, respectively). The temperature, the imparted voltage, and the geometric dimensions of the anode (device 11) are assigned so that electric discharges between said anode and the materials of furnace 2 and with the surface of liquid metal 4 not occupied by melt 6 are not initiated. Moreover, the area of the surface of the anode (device 11) is such that it maximally overlaps the area of the surface of melt 6 without causing the described electrical discharges.

Melt 6 (prepared according to Items 1.2 and 1.3, and as described under Items 4.1.1), represented by Structural Compound C, has in Part A regions characterized by an unstable intermediate state arising because of mechanical stresses and shear deformation explained by the presence of micro-non-uniformity in the melt and the action of a thermal field. In this state (when old chemical bonds are weakened and/or broken and new bonds are formed), at the moment of breakage of the chemical bond, the energy of an electron can be greater than the energy of other electrons which belong to the chemical elements of Part A and is sufficient for the detachment of the electron by the action of an electrostatic field with an intensity necessary for this which is technically accomplished in the present method.

The electrostatic field, with a strength not causing electric discharges in medium 13, displaces the mobile cations of Part B in melt 6 and together with the action of the thermal field with a temperature above the vitrification temperature (when the number of breaks of chemical bonds in Part A is greatest - one of the conditions required for the diffusion of cations of Part B in the bulk of the glass-forming melt) leads to the efficient transfer of cations of Part B towards the cathode (device 10) and to the detachment from Part A of electrons having sufficient energy for this, which (after their detachment) acquire the state of a free electron.

The free electrons moving in the electrostatic field towards the anode (device 11) and cations of Part B moving towards the cathode (device 10) establish a current in melt 6. Correspondingly, a current is established in the electric circuit including melt 6, medium 13, and the elements creating the electrostatic field. The current in this circuit signifies the implementation of processes of transfer, neutralization, and removal of the cations of mobile Part B from melt 6, just as in an electrochemical cell, and corresponds to the process described under heading 4.2.1 in connection with FIG. 2, with the differences that:

a) the internal circuit consists of a glass-forming melt and a medium (e.g., a gas or a vacuum) inert with respect to this melt;

b) the anode and the cathode are the electrodes establishing the electrostatic field together with other appropriate elements of the electric circuit; and c) the anode is not in contact with melt, thereby eliminating problems of the formation of a layer near the anode and the processes associated with its renewal and/or decomposition, and eliminating the anode processes, typical of a regular electrochemical cell, and their effect on the characteristic of changes of the electric current.

The change of the current (by regulating the voltage) in the electric circuit of the electrostatic field occurs with formation of at least one cathode process with the current reaching its limiting value for this process, and a further change of the current will occur only in the case of a change of the cathode processes that are feasible within the voltage limits that do not cause the above described electric discharges.

A change of the cathode processes (by regulating the voltage) is accompanied by an increase of the current in the above-described electric circuit to new limiting values and occurs due to different kinetics of the transfer of cations of Part B in the case of the availability in the melt of cations of a different value of their charge and/or different nature. Consequently, for the purpose of changing the concentration of the desired cation of Part B, the voltage is regulated.

The finite series of physicochemical processes in melt 6 in furnace 2 under the action of the thermal field and a direct current in the electric circuit including elements forming the electrostatic field and which also includes melt 6 and medium 13 and in which the anode (device 11) is separated by medium 13 from melt 6, creates conditions for changing the concentration of the mobile cations of Part B with their removal from melt 6 in the electrochemical process and, according to the present invention, leads to the formation from the homogeneous system (i.e., from the starting glass-forming single-phase multi-component melt) of the heterogeneous system which consists of at least two phases:

$$SMe^p_f Me^q_m V^k_n \rightarrow rMe^p_f + (S-r)Me^p_f Me^q_m V^k_n$$

one phase $rMe^p_f$ is the modified Part B of Structural Compound C and is at the same time the neutralized cations identified in Item 1.3;

the other phase $(S-r)Me^p_f Me^q_m V^k_n$ is the modified Structural Compound C after the removal of the mobile cations in the amount of $SMe^p_f - rMe^p_f$ and is identified in items 1.2 and 1.3.

The equipment of an electrochemical cell and methods for organizing an electrochemical process with the application of the present invention for each specific case in practice will be different and with a different combination but must include the essential elements of an electrochemical cell—at least one device made of low electrical resistance material must be a cathode on which with contacting relation is placed the melt of the glass-forming feed mix—and one device made of low electric resistance material must be an anode separated from this melt by a medium inert with relation to this melt, and in addition these devices must be joined by this melt and the medium in an electric circuit which includes a direct current voltage source.

Figure 5:
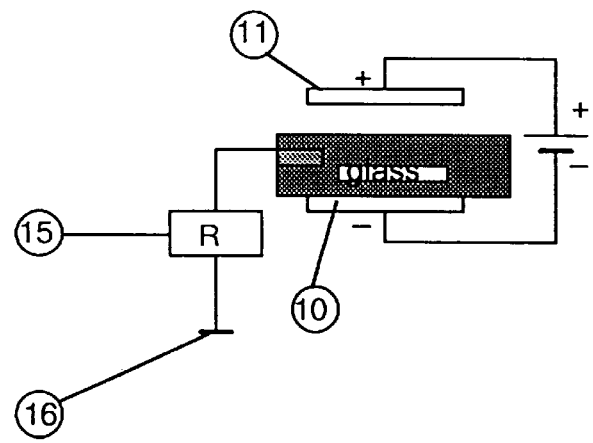
FIG. 5 is a schematic illustrating the process of obtaining an excess positive charge in the melt and its neutralization in accordance with the present invention.

The modification of Part B takes place in the process of neutralization of individual cations by electrons detached from Part A by the electrostatic field. When the imparted voltage in the electric circuit of the electrostatic field is effective in such a way that the number of electrons detached from Part A and creating the electric current between the anode (device 11) and the cathode (device 10) exceeds the number of electrons required for neutralizing the cations of Part B, then the electrons can move in the electric circuit (schematic diagram is shown in FIG. 5) including device 14 made of low electrical resistance material and capable of gaining electrons between said anode and cathode. This (these) device(s) in the general case is (are) located (e.g., in FIG. 5, this is device 14 within the melt) between the anode and the cathode so that the electrochemical process is not interrupted or changes of values characterizing the electrochemical process can be disregarded and are joined in an electric circuit (electric circuits) with the surface(s) having a more positive potential (e.g., in FIG. 5, this is surface 16), so that a current towards this (these) surface(s) is created, as a result of which a surplus positive charge distributed in the bulk will be formed in Structural Compound C and electric power will be stored. By regulating the voltage in the electric circuit of the electrostatic field, conditions are created where in the electric circuit of the device joined with the surface of a more positive potential an electric current is created towards Structural Compound C and its excess positive charge is neutralized, with an electric load, if present (e.g., in FIG. 5, this electric load is 15), performing work, consuming the electric power stored during the formation of the excess positive electric charge in Structural Compound C.

Furnace 2 can have temperature zones from one end to the other (typically with higher temperatures at the entrance and lower temperatures towards the exit) which determine (and can change) the viscosity of melt 6 to a viscosity permitting the creation of a geometric shape of the sheet which is physically stable for handling, in the zone of which the anode(s) and cathode(s) of the electrostatic field are arranged in such a way that they do not contact the sheet (not shown in FIG. 4) for obtaining an excess positive electrical charge in Structural Compound C and with those procedures as described above for the case in which melt 6 is in contact with the cathode (device 10).

The combination of the thermal and electrostatic fields leads to a change of concentration of the cations of mobile Part B in melt 6, their removal from the melt, or a partial removal without the formation (when not all electric circuits are closed, i.e., an electric circuit of devices joined with a surface of more positive potential) or with the formation (when all electric circuits are closed) of a surplus positive charge distributed in the bulk of the remaining part of the melt, the charge being maintained by the electrostatic field.

4.2.3 The Change Of Concentration Of Part B In Structural Compound C In The Thermal, Electric, And Electrostatic Fields The melt exhibiting the properties of an electrolyte and represented by Structural Compound C is either forced or flows independently from furnace 1 into furnace 2.

Part A in the melt, characterized by the negative charge formed by excess electrons, has electrons which can have, just as the electrons at the moment of formation of the intermediate state of Part A can have, an energy greater than the energy of other electrons which belong to the chemical elements of Part A.

For changing the concentration of the cations of Part B by removing them from the melt, a finite series of physico-chemical processes (6)

$$T^{n-m}, \ldots, T^{n-(m-1)}, T^{n-(m-2)}, \ldots, T^{n-(m-k)}$$

constituting the electrochemical process (FIG. 6) is implemented in furnace 2 which has the devices described above and in the sequence in which these devices are shown in FIG. 1 and with some changes shown in FIG. 6 and described as follows. Device 3 together with liquid metal 4, as is shown in FIG. 1, is device 17 in FIG. 6 and serves as the cathode in the electrochemical cell. Device 5 for transferring the melt onto liquid metal 4, as is shown in FIG. 1, is made of low electric resistance material and is device 18 in FIG. 6 and serves as the anode in the electrochemical cell. Melt 6 (in FIG. 6) is passed from furnace 1 into furnace 2 in contacting relationship with and sequentially between and from device 18 to device 17. Devices 18 and 17 are in and complete with melt 6 and the direct current voltage source 19 an electric circuit of the electrochemical cell. Device 3 together with liquid metal 4 (e.g., tin or lead), which is device 17 in FIG. 6, in addition to serving as the cathode of the electrochemical cell, simultaneously serves as a cathode in the electric circuit of the electrostatic field, the anode of which is device 20 made of material of low electric resistance and is separated from melt 6 by medium 21 (e.g., a gaseous one), which is inert with respect to melt 6. Devices 17 and 20 (the cathode and anode, respectively.) are joined by melt 6 and medium 21 in an electric circuit, which includes direct-current voltage source 22. By imparting a voltage in the electric circuit of device 20, which is not in contact with melt 6, an electrostatic field between devices 20 and 17 is created in such a way that the direct electric current created as a result of imparting the voltage is passed through device 17 (the cathode), device 20 (the anode), medium 21, and melt 6, and by imparting a voltage in the electric circuit of device 18, which is in contact with melt 6, a direct electric current is passed through device 17 (the cathode), device 18 (the anode), and melt 6, and in this manner the concentration of cations of Part B is lowered with their removal from melt 6 simultaneously in the electric circuit including the anode in contact with melt 6 and in the electric circuit including the anode separated from melt 6 by medium 21 in the cathode processes common for the classic electrochemical cell and in this case with dissolution of metals of the same kind as the removed cations of Part B into the liquid metal 4 (e.g., tin or lead) of device 17.

A traditional electrochemical process in melts of the glass-forming mixtures (formed according to Items 1.2 and 1.3 and as described in Item 4.1.1) starts in its first step with the neutralization of that part of the lattice (Part A) which contacts the anode, giving up electrons to it. The process of neutralization of one part of the lattice occurs, with the formation next to the anode of a three-dimensional electrically neutral layer which, as a whole, is a monostructure and essentially a continuous extension of the lattice and is represented practically only by those chemical elements which constitute Part A.

Conservation of the lattice and the electrically neutral layer as a single whole does not mean that neutralization of that part of the lattice which formed the electrically neutral layer is followed by continuous neutralization of other parts of the lattice having a negative charge, since the lattice is a dielectric (i.e., does not have electronic conductivity) which becomes conducting only when high breakdown voltage is applied to it, accompanied by decomposition of the substance (in this case the electrically neutral layer and the lattice). Due to this decomposition, the conduct of the electrochemical process becomes meaningless if the goal is preservation of the lattice and obtaining it as a material.

With the formation of an electrically neutral layer, neutralization of the lattice ceases because of the absence of electric conductivity in the layer, as a result of which the current in the electric circuit is decreased to such a minimum value (practically ceases) that the electrochemical process becomes ineffective.

Since the atoms of the electrically neutral layer are bonded between themselves as a whole in a three-dimensional structure and the layer maintains with other parts of the lattice the structural bonding in at least one direction, the layer near the anode is not renewed as occurs in the case with electrolytes. It is known that the electrochemical process depends on the renewal of the layer near the anode and the cathode. In the case of ordinary electrolytes, where atoms and ions are separate structural units allowing ions to be transported by the electric field to the anode (cathode) and the number of ions in the layer near the anode (cathode) is in dynamic equilibrium with the neutralized ions, which are constantly renewed, retaining the quality of the separate structural units, the layer near the anode (cathode) is renewed and the continuity of the current in the electric circuit is maintained.

The renewing of the layer near an anode by anions in the same manner as in electrolytes is impossible even in the case when Part A in the melt consists of spatially separated macroparts (multi-atomic anions in the form of separate structural units), since the macropart-anions in the layer near the anode are neutralized and coalesce with each other, forming an insulating or neutral layer (as a whole practically a monostructure) preventing the neutralization of the other macropart-anions. In said melts, the electrically neutral layer is renewed under conditions of a prolonged spatial redistribution of lattice-forming atoms. The duration of the redistribution of atoms in the layer is affected by the strength of the chemical bonds and the process of breakage (formation) of these bonds under the action of a thermal field. For the reasons presented above, the process of removal of the mobile Part B from said melts in the electric circuit of a conventional electrochemical cell is ineffective.

In melt 6 flowing out of furnace 1 (FIG. 6) through the region near the surface of the anode (device 18) (with renewal of the layer near the anode) onto the cathode (device 17) in furnace 2, which simultaneously is the cathode of another electric circuit creating the electrostatic field, there occurs a finite series of physicochemical processes (6) leading to the formation of an electrochemical process in melt 6 with simultaneous efficient removal of the cations of mobile Part B from melt 6 in the electrochemical cell and the electrostatic field [in the electric circuit with the anode (device 18) contacting melt 6 and in the electric circuit with the anode (device 20) not contacting melt 6].

During movement of melt 6 through the region near the anode (device 18), parts of the lattice contacting the anode are continuously replaced by new parts of the lattice, which give off electrons to the anode in an anode process, i.e., the layer near the anode is renewed and the effective current in the electric circuit continues. Thus, the electrochemical process in melt 6 continues with anode-cathode processes, with conductivity in melt 6 by electrons and ions, with efficient removal of cations of Part B from melt 6 in the electric circuit of the anode (device 18) contacting this melt.

In furnace 2 (FIG. 6), melt 6 spreads out on liquid metal 4 (e.g., tin or lead) of the cathode (device 17), which simultaneously is the cathode of the electrostatic field. The spreading of melt 6 is not restricted and this melt does not come in contact with the walls of device 3 containing liquid metal 4. Since melt 6 spreads out freely, it has the maximum area of surface contact with the cathode (device 17) which can be achieved. The anode (device 20) of the electrostatic field has no contact with melt 6, is separated from melt 6 by medium 21 which is inert with respect to this melt, and sets up an electrostatic field perpendicular to the direction movement of melt 6 and this anode together with the cathode (device 17) are connected to source 22 of direct-current voltage, forming together with other necessary elements (e.g., measuring instruments) an electric circuit. The temperature, imparted voltage, and geometric dimensions of the anode (device 20) are assigned so that electric discharges (electric arc breakdown) between this anode and the materials of furnace 2 and with the surface of liquid metal 4 not occupied by melt 6 are not initiated. At the same time, the area of the surface of the anode (device 20) is such that it maximally overlaps the area of the surface of melt 6 without causing the described electric discharges.

In the case where medium 21 (in FIG. 4 this is 13) is a gas (e.g., as opposed to a deep vacuum), the temperature, imparted voltage, and pressure are regulated in such a way as to create between the anode (device 20) (in FIG. 4 this is device 11) and melt 6 in the process of ionization of the gas by a stream of electrons [moving from melt 6 through gaseous medium 21 to the anode (device 20)] a glow discharge in order not to have in said medium unexpected electric discharges and in order to achieve a stable technological process in furnace 2.

Melt 6 (prepared according to Items 1.2 and 1.3, and as described under Item 4.1.1), represented by Structural Compound C, has in Part A regions characterized by an unstable intermediate state arising because of mechanical stresses and shear deformation explained by the presence of micro-non-uniformity in the melt and the action of a thermal field. In this state (when old chemical bonds are weakened and/or broken and new bonds are formed), at the moment of breakage of the chemical bond, the energy of an electron can be greater than the energy of other electrons which belong to the chemical elements of Part A and is sufficient for the detachment of the electron by the action of an electrostatic field with an intensity necessary for this which is technically accomplished in the present method.

The electrostatic field, with a strength not causing electric discharges in medium 21, displaces the mobile cations of Part B in melt 6 and together with the action of the thermal field with a temperature above the vitrification temperature (when the number of breaks of chemical bonds in Part A is greatest—one of the conditions required for the diffusion of cations of Part B in the bulk of the melt) leads to the efficient transfer of cations of Part B towards the cathode (device 17) and to the detachment from Part A of electrons having sufficient energy for this, which (after their detachment) acquire the state of a free electron.

The free electrons moving in the electrostatic field towards anode (device 20) and cations of Part B moving towards cathode (device 17) establish a current in melt 6. Correspondingly, a current is established in the electric circuit including melt 6, medium 21, and the elements creating the electrostatic field. The current in this circuit signifies the implementation of processes of transfer, neutralization, and removal of cations of mobile Part B from melt 6, just as in an electrochemical cell of the electric circuit with the anode (device 18) contacting melt 6. The finite series of physicochemical processes in moving melt 6 under the action of a thermal field, an electric field in an electric circuit of an electrochemical cell with an anode (device 18) contacting melt 6, and an electrostatic field in an electric circuit with an anode (device 20) not contacting melt 6, creates an efficient electrochemical process for changing the concentration and the removal of cations of mobile Part B from melt 6 and, according to the present invention, leads to the formation from the homogeneous system (i.e., from the starting glass-forming single-phase multi-component melt) of the heterogeneous system which consists of at least two phases:

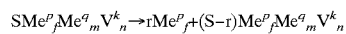

$$SMe^p_f Me^q_m V^k_n \rightarrow rMe^p_f + (S-r)Me^p_f Me^q_m V^k_n$$

one phase $rMe^p_f$ is the modified Part B of Structural Compound C and at the same time the neutralized cations identified in Item 1.3;

the other phase $(S-r)Me^p_f Me^q_m V^k_n$ is the modified Structural Compound C after the removal of the mobile cations in the amount of $SMe^p_f - rMe^p_f$ and is identified in Items 1.2 and 1.3.

The equipment of an electrochemical cell and methods for organizing an electrochemical process with the application of the present invention for each specific case in practice will be different and with a different combination but must include the movement of the glass-forming melt in contacting relationship with and sequentially between and from device to device made of low electrical resistance material for the purpose of achieving renewal of the layer at the anode. In addition, among the devices there must be the essential elements of an electrochemical cell—at least one device must be the anode and one device must be the cathode incorporated into the electric circuit of a direct current voltage source. At the same time, this same melt is placed in an electrochemical cell, where an electrostatic field acts on this same melt and the electric circuit forming an electrostatic field must include the essential elements of an electrochemical cell—at least one device made of low electrical resistance material must be a cathode (which at the same time is the cathode of an electrochemical cell with an anode contacting the moving glass-forming melt) on which with contacting relation is placed the melt of the glass-forming feed mix and one device made of low electric resistance material must be an anode separated from said melt by a medium inert with relation to this melt, in addition these devices must be joined by this melt and the medium in an electric circuit which includes a direct current voltage source.

The modification of Part B takes place in the process of neutralization of individual cations by electrons detached from Part A by the electrostatic field. When the imparted voltage in the electric circuit with the anode (device 20) not contacting melt 6 is effective in such a way that the number of electrons detached from Part A and creating the electric current between this anode and the cathode (device 17) exceeds the number of electrons required for neutralizing the cations of Part B, then the electrons can move in the electric circuit (schematic diagram is shown in FIG. 5) including device 14 made of low electrical resistance material and capable of gaining electrons between the anode (device 20) and the cathode (device 17). This (these) device(s) in the general case is (are) located (in FIG. 5, this is device 14 within the glass-forming melt) between the anode and the cathode so that the electrochemical process is not interrupted or changes of values characterizing the electrochemical process can be disregarded and are joined in an electric circuit (electric circuits) with the surface(s) having a more positive potential (in FIG. 5, this is surface 16), so that a current towards this (these) surface(s) is created, as a result of which a surplus positive charge distributed in the bulk will be formed in Structural Compound C and electric power will be stored. By regulating the voltage in the electric circuit of the electrostatic field conditions are created where in the electric circuit of the device joined with the surface of a more positive potential an electric current is created towards Structural Compound C and its positive charge is neutralized, with an electric load, if present (in FIG. 5, this electric load is 15), performing work, consuming the electric power stored during the formation of the excess positive electric charge in Structural Compound C.

Furnace 2 can have temperature zones from one end to the other (typically with higher temperatures at the entrance and lower temperatures towards the exit), which determine (and can change) the viscosity of melt 6 to a viscosity permitting the creation of a geometric shape of the sheet which is physically stable for handling, in the zone of which the anode(s) and cathode(s) of the electrostatic field are arranged in such a way that they do not contact the sheet (not shown in FIG. 6) for obtaining an excess positive electrical charge in Structural Compound C and with those procedures as described above for the case in which melt 6 is in contact with the cathode (device 17).

The combination of the thermal, electric, and electrostatic fields leads to a change of concentration of the cations of mobile Part B in melt 6, with their removal from this melt, or a partial removal with the formation (when all electric circuits are closed) of a surplus positive charge distributed in the bulk of the remaining part of this melt and maintained by the electrostatic field or without the formation of said positive charge in this melt (when not all electric circuits are closed, i.e., electric circuits of devices joined with a surface of more positive potential are not closed).

4.3 Obtaining The Vitreous Material And Metals.

For obtaining material from a glass-forming melt, in which the concentration of the components of the starting chemical composition is changed with simultaneous obtaining of metals as a result of the process of the change in concentration, a finite series of physicochemical processes (7)

$T^{n-(m-k)}, \ldots, T^{n-1}, T^n$ is implemented during cooling of the glass-forming melt with a changed concentration of components to the vitrification temperature and below with actions necessary for obtaining sheet by drawing of the glass-forming melt in the process of its cooling in the zone of furnace 2 by means of the equipment of this furnace and auxiliary equipment 7 (FIG. 1, 2, 4, or 6) customary for the float process. In addition, the finite series of physicochemical processes (7) is characterized by the reconstruction of the chemical bonds under the action of mechanical forces arising in the process of drawing the glass-forming melt being cooled and before the completion of relaxation processes in the zone of furnace 2 having temperature conditions for changing the viscosity of this melt to the values required and during the time needed for the completion of relaxation processes and a full transition of Structural Compound C into a solid state.

The supercooling to the vitrification temperature and below of melt 6 disposed in furnace 2 in the zone of the cathode process and in the zone of its drawing by auxiliary equipment 7 after the electrochemical process in this melt in the electric circuit of the electrochemical cell with an anode contacting and/or not contacting this melt, leads during the period of cessation of relaxation processes to the obtaining of vitreous material with a structure and concentration of chemical elements and compounds corresponding to the structure and concentration of the chemical elements and compounds of this melt at the moment of completion of relaxation processes and with an excess positive charge (in the case when all the electric circuits are closed) acquired by melt 6 in the electrochemical process and retained by the electrostatic field.

Figure 4:
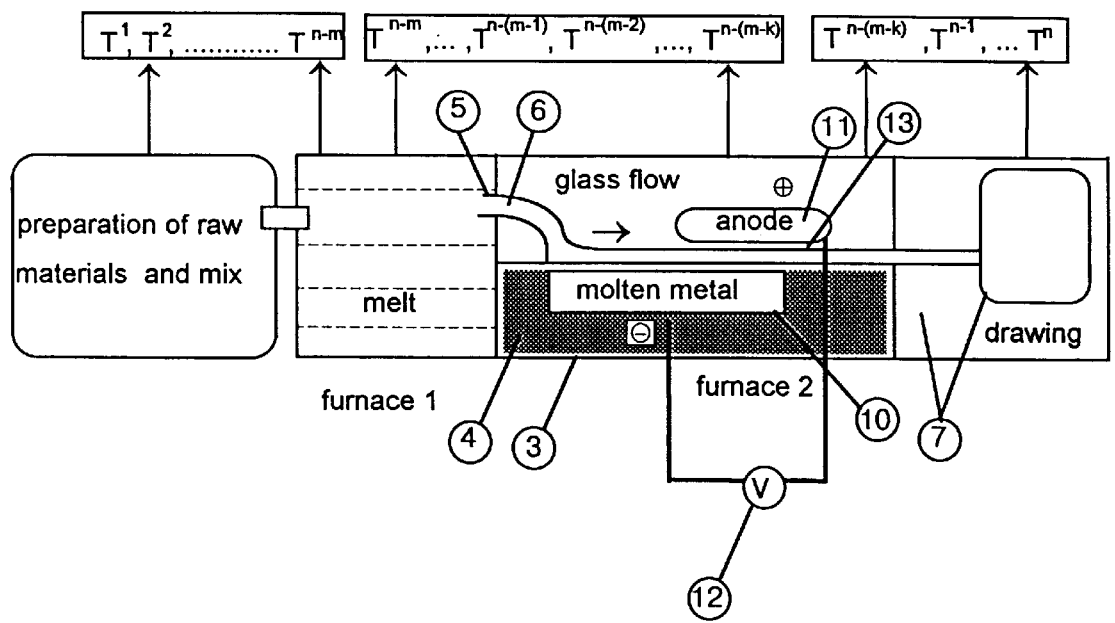
FIG. 4 is a schematic of the float glass process wherein an electrostatic field is used to organize an electrochemical process in accordance with the present invention.
Figure 6:
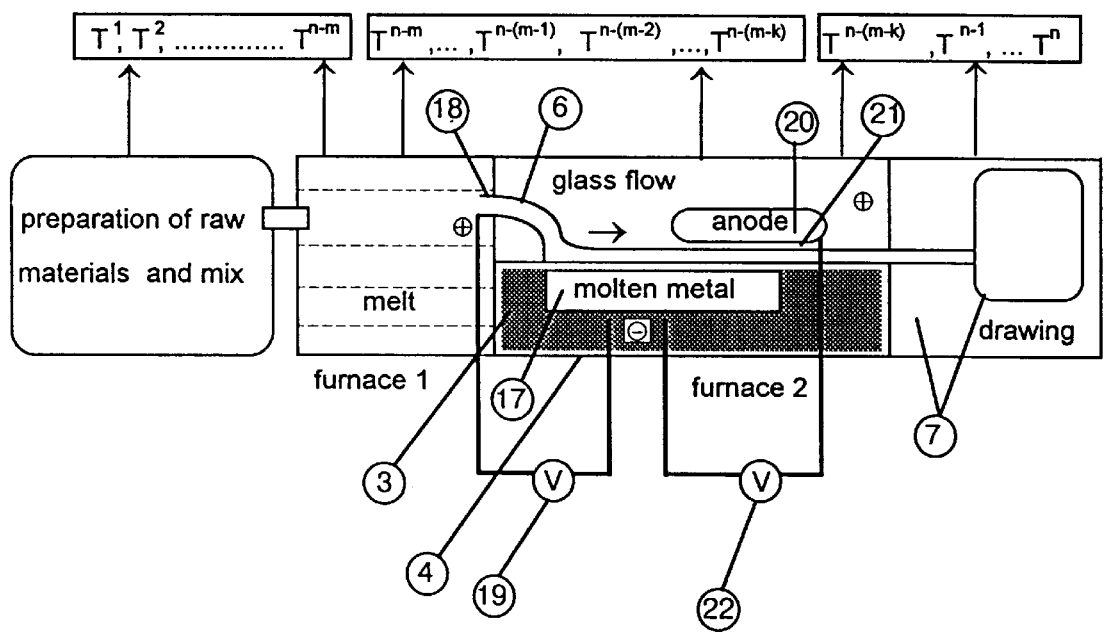
FIG. 6 is a schematic of the float glass process wherein both an electric field and an electrostatic field are used together to organize an electrochemical process in accordance with the present invention.

The technological conditions for renewal of molten metal-cathode (in FIGS. 2, 4, and 6 it is 9, 10, and 17, respectively.) (which is continuously saturated by the metals of the same kind as the cations of Part B in cathode processes during practice of the inventive process) and its accumulation for its subsequent treatment (i.e., processing by known methods for obtaining as an end product the metals of the same kind as the cations of Part B after their neutralization in cathode processes) are ensured by the equipment in furnace 2 or in the auxiliary equipment outside of furnace 2 (not shown in the figures). The obtained metals can be oxidized to obtain their oxides as the end product, with recovery of the heat released in the oxidation process. The inventive vitreous material represented by the chemical elements identified in Items 1.2 and 1.3 with the desired sizes, geometry, technical characteristics, and consumer qualities can be obtained as an end product according to the following scheme:

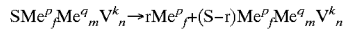

$$SMe^p_f Me^q_m V^k_n \rightarrow rMe^p_f + (S-r) Me^p_f Me^q_m V^k_n$$

or as a semi-finished product for obtaining products customary for the glass industry or these products can be obtained directly during the cooling of the glass-forming melt by shaping methods customary for the glass industry (e.g., blowing, pressing, drawing, etc.).

Figure 7:
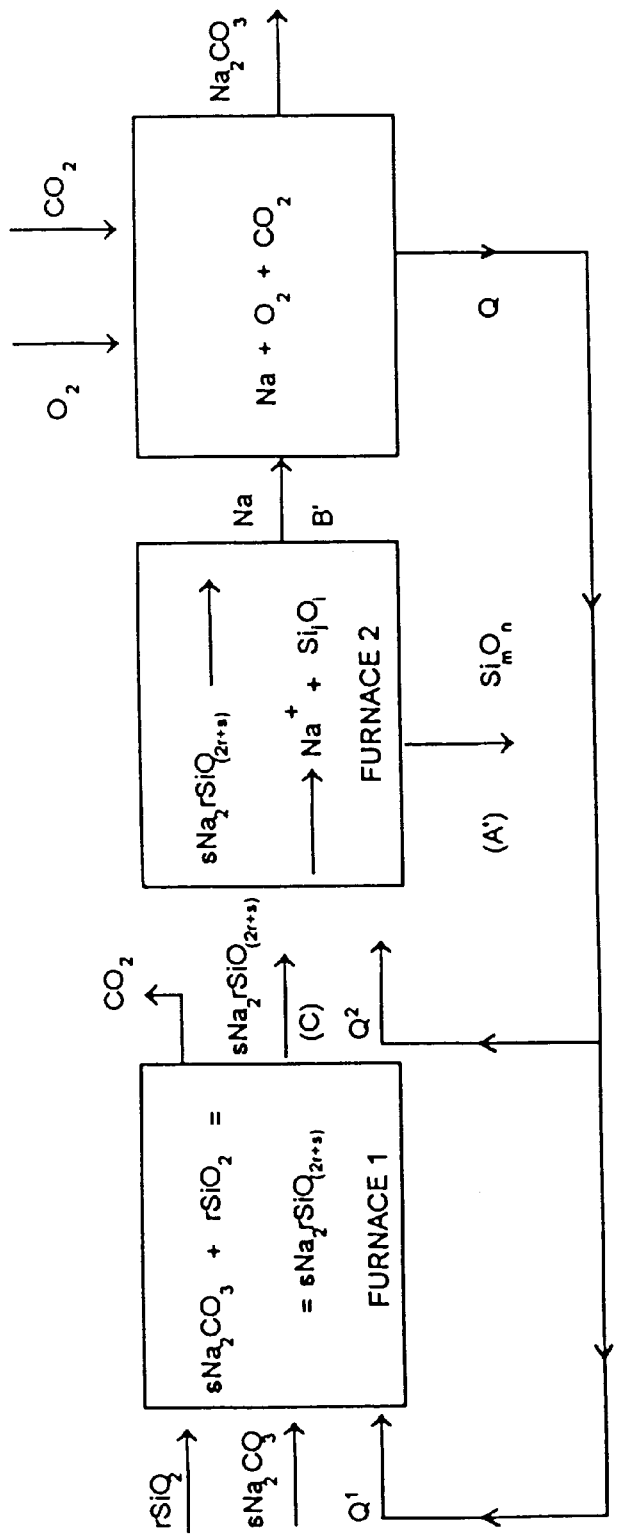
FIG. 7 is a schematic that illustrates the Example (previously stated).

FIG. 7 is a flow diagram of the process of obtaining a quartz-like material $Si_m O_n$, and metallic sodium from a starting mix ($Na_2CO_3+SiO_2$), and the oxidation of the metallic sodium to the starting component $Na_2CO_3$ with utilization of the heat evolved during oxidation in process operations.

In the practice of the application of the invention for obtaining the desired product from the glass-forming melt, the equipment will be selected as is customary in the glass industry, with the inclusion of the necessary features to implement the present invention.

We claim:

1. A method of producing a single phase vitreous material from a melt of a glass-forming multi-component feed mix which comprises the steps of:

(a) preparing a single phase melt in which there are mobile cations from a glass forming feed mix, components of which feed mix are chemical compounds selected from the group consisting of a chemical compound which includes a univalent metal which in the melt is a mobile cation, a chemical compound including a divalent metal which in the melt is a mobile cation, and mixtures thereof, and chemical compounds selected from the group consisting of a chemical compound which includes a trivalent metal, a chemical compound which includes a metal with a valence higher than three (3), and mixtures thereof;

(b) passing said melt in contacting relationship with and sequentially between devices made of low electrical resistance material from device to device, said devices in and completing with the melt and a direct current voltage source an electric circuit in which circuit there is a said device serving as an anode and there is a said device serving as the cathode;

(c) regulating a voltage in said electrical circuit so that a direct electrical current is created in it and the concentration of the mobile cations in said melt is lowered thereby with reduction on the cathode of the metals of the same kind as the mobile cations; and (d) cooling said melt which has the lowered concentration of said mobile cations to produce the material as a structural article.

2. The method of claim 1 wherein the glass forming feed mix melt having a lowered concentration of said mobile cations is cooled in the range of the temperatures of crystallization of this melt at a rate so as to obtain a material from this melt in the amorphous state, this material being in the form of a structural article.

3. The method of claim 1 wherein the melt of the glass forming feed mix having a lowered concentration of said mobile cations is maintained in the range of the temperatures of crystallization of this melt in such a way so as to obtain a material from this melt in the crystalline state, this material being in the form of a structural article.

4. The method of claim 1 wherein said components are in the form of compounds selected from the group consisting of oxides, fluorides, bromides, carbonates, sulfates, nitrates, phosphates, and mixtures thereof.

5. The method of claim 1 wherein said components in the form of compounds selected from the group consisting of carbonates, sulfates, nitrates, phosphates, and mixtures thereof, are transformed in step (a) into components of the feed mix.

6. The method of claim 1 wherein said components comprise the chemical compound the carbonate $Na_2CO_3$, which in step (a) is transformed into the starting component $Na_2O$, which includes the univalent metal sodium, and the chemical compound the oxide $SiO_2$, which includes metal silicon with a valence higher than three (3).

7. The method of claim 1 wherein said components comprise the chemical compound $Na_2CO_3$ and the chemical compound $SiO_2$ and in which the concentration of the cations of the univalent metal sodium (Na) is lowered in order to obtain a single phase material of fused oxide of the higher valent metal silicon (Si) having a valence higher than three (3) in the form of quartz glass ($SiO_2$).

8. The method of claim 1 wherein in a furnace prepared for lowering the concentration of mobile cations the temperature is above the vitrification temperature of the glass forming feed mix melt placed into said furnace.

9. The method of claim 1 wherein the low electrical resistance material which serves as the cathode is the metal being reduced on the cathode.

10. The method of claim 1 wherein the low electrical resistance material which serves as the cathode dissolves metals being reduced on the cathode.

11. The method of claim 10 wherein the low electrical resistance material that serves as the cathode comprises tin.

12. The method of claim 1 wherein to implement steps (a), (b), (c), and (d) the method and equipment for the float glass process is used, and for step (c) a furnace which includes a device with liquid metal and a device for transferring the float glass melt onto the liquid metal is used so that this device of liquid metal serves as the cathode, and the device for transferring the float glass melt is made from a low electrical resistance material and serves as the anode.

13. The method of claims 1 or 12 wherein said melt is passed from the device that serves as the anode to and onto the device that serves as the cathode.

14. The method of claim 12 wherein the low electrical resistance material which serves as the cathode is the metal being reduced on the cathode.

15. The method of claim 12 wherein the low electrical resistance material which serves as the cathode dissolves metals being reduced on the cathode.

16. The method of claim 15 wherein the low electrical resistance material that serves as the cathode comprises tin.

17. The method of claims 9, 10, 11, 14, 15, or 16 wherein the low electric resistance material which serves as the cathode and contains metals being reduced on the cathode is removed from the cathode device for subsequently obtaining the reduced metals.

18. The method of claim 17 wherein the subsequently obtained metals are oxidized to obtain heat which is recovered.

19. The method of claim 18 wherein the recovered heat is utilized in the present method.

20. The method of claim 19 wherein the recovered heat is utilized in step (a) of the present method.

21. The method of claim 17 wherein the subsequently obtained metals are oxidized in order to obtain components which form the glass forming feed mix.

22. A method of producing a single phase vitreous material from a melt of glass forming multi-component feed mix which comprises the steps of:

(a) preparing a single phase melt in which there are mobile cations from a glass forming feed mix, components of which feed mix are chemical compounds selected from the group consisting of a chemical compound which includes a univalent metal which in the melt is a mobile cation, a chemical compound including a divalent metal which in the melt is a mobile cation, and mixtures thereof, and chemical compounds selected from the group consisting of a chemical compound which includes a trivalent metal, a chemical compound which includes a metal with a valence higher than three (3), and mixtures thereof, and (b) placing said melt in contacting relationship with a device made from low electrical resistance material and which serves as a cathode, there also being a device made of low electrical resistance material and which serves as an anode, said anode separated from said melt by a medium which is inert with respect to the melt, and thereby said melt and said medium complete an electric circuit including said devices, said melt, said medium, and a direct current voltage source;

(c) regulating a voltage in said electric circuit to create an electrostatic field between the cathode and anode so that a direct electrical current is created and is passed through said cathode, said anode, said medium, and said melt, and thus the concentration of mobile cations in said melt is lowered with reduction on the cathode of the metals of the same kind; and (d) cooling said melt which has the lowered concentration of said mobile cations to produce the material as a structural article.

23. The method of claim 22 wherein the glass forming feed mix melt having a lowered concentration of said mobile cations is cooled in the range of the temperatures of crystallization of this melt at a rate so as to obtain a material from this melt in the amorphous state, this material being in the form of a structural article.

24. The method of claim 22 wherein the melt of the glass forming feed mix having a lowered concentration of said mobile cations is maintained in the range of the temperatures of crystallization of this melt in such a way so as to obtain a material from this melt in the crystalline state, this material being in the form of a structural article.

25. The method of claim 22 wherein said components are in the form of compounds selected from the group consisting of oxides, fluorides, bromides, carbonates, sulfates, nitrates, phosphates, and mixtures thereof.

26. The method of claim 22 wherein said components in the form of compounds selected from the group consisting of carbonates, sulfates, nitrates, phosphates, and mixtures thereof are transformed in step (a) into components of the feed mix.

27. The method of claim 22 wherein said components comprise the chemical compound the carbonate $Na_2CO_3$, which in step (a) is transformed into the starting component $Na_2O$, which includes the univalent metal sodium and the chemical compound the oxide $SiO_2$ which includes metal silicon with a valence higher than three (3).

28. The method of claim 22 wherein said components comprise the chemical compound $Na_2CO_3$ and the chemical compound $SiO_2$ and in which the concentration of the cations of the univalent metal sodium (Na) is lowered in order to obtain a single phase material of fused oxide of the higher valent metal silicon (Si) having a valence higher than three (3) in the form of quartz glass ($SiO_2$).

29. The method of claim 22 wherein in a furnace prepared for lowering the concentration of mobile cations, the temperature and the impressed voltage are regulated to create an effective electrical current in this electric circuit so as not to cause an electrical arc breakdown in said medium either between the anode and the materials of the furnace or between the anode and the cathode in direct contact with said medium.

30. The method of claim 29 wherein for substantial lowering of the concentration of mobile cations, the temperature in said furnace is above the vitrification temperature of the glass forming feed mix melt placed into this furnace onto the device which is made of low electrical resistance material and serves as the cathode.

31. The method of claim 22 wherein the low electrical resistance material which serves as the cathode is the metal being reduced on the cathode.

32. The method of claim 22 wherein the low electrical resistance material which serves as the cathode dissolves the metals being reduced on the cathode.

33. The method of claim 22 wherein the low electrical resistance material is tin.

34. The method of claim 22 wherein to implement steps (a), (b), (c), and (d), the float glass process is practiced and for step (c) a furnace which includes a device with liquid metal is used, wherein this device of liquid metal serves as the cathode.

35. The method of claim 22 or 34 wherein the furnace practiced for implementing steps (b) and (c) the temperature is above the vitrification temperature wherein a material with a modified surface layer is obtain ed by conducting the method for a time duration determined so that substantial lowering of the concentration of mobile cations in the melt of the glass forming feed mix occurs in the surface layer facing the anode.

36. The method of claim 35 wherein sheet glass with a modified surface layer is produced.

37. The method of claim 36 wherein sheet glass with a modified surface layer is produced from a melt of low temperature eutectics of a glass forming feed mix.

38. The method of claim 22 or 34 wherein the medium inert with respect to the melt of the glass forming feed mix consists of a gas.

39. The method of claim 38 wherein the gas is an inert gas.

40. The method of claim 38 wherein the gas is nitrogen.

41. The method of claims 22 or 34 in which said medium is a gas wherein the temperature, impressed voltage, and pressure are regulated to create an electrical current in the gaseous medium between the melt of the glass forming feed mix and the anode in such a way as to form in said medium by means of the ionization of the gas by the flow of electrons moving from said melt to the anode a glowing electric discharge in the gas for the establishment of a stable process of lowering the concentration of mobile cations in said melt.

42. The method of claim 34 wherein the low electrical resistance material which serves as the cathode is the metal being reduced on the cathode.

43. The method of claim 34 wherein the low electrical resistance material which serves as the cathode dissolves the metals being reduced on the cathode.

44. The method of claim 43 wherein the low electrical resistance material is tin.

45. The method of claims 31, 32, 33, 42, 43, or 44 wherein the low electrical resistance material which serves as the cathode and contains metals being reduced on the cathode is removed from the cathode device for subsequently obtaining the reduced metals.

46. The method of claims 45 wherein the subsequently obtained metals are oxidized to obtain heat which is recovered.

47. The method of claim 46 wherein the recovered heat is utilized in the present method.

48. The method of claim 47 wherein the recovered heat is utilized in step (a) of the present method.

49. The method of claim 45 wherein the subsequently obtained metals are oxidized in order to obtain components which form the glass forming feed mix.

50. The method of claim 29 wherein the impressed voltage is effective so that the number of electrons creating the electrical current between said anode and said cathode exceed the number of electrons required to neutralize the mobile cations on the cathode, and (I) there is another electric circuit which includes a device made of low electrical resistance material and capable of gaining electrons which is situated between but not in contact with said anode and said cathode in such a way so that the process is not interrupted and this device is connected by a conductor to a surface of more positive potential which creates an electrical current in this thus-formed electric circuit thereby simultaneously creating a positive charge in the melt of the glass forming feed mix, and (ii) wherein the melt with positive charge is withdrawn from the electrostatic field and cooled to obtain material in the form of a structural article in the amorphous or crystalline state.

51. The method of claim 22 wherein said melt in step (d) is cooled to a temperature wherein the melt is physically stable for handling and (j) is arranged between devices made from low electrical resistance material adjacent to but spaced apart from said cooled melt which devices are connected to a direct current voltage source where one device serves as an anode and the other device serves as a cathode, and (k) there also is a device made from low electrical resistance material in contact with said cooled melt connected to a surface of more positive potential, and (l) the voltage is regulated in electric circuit (j) to establish an electric current in this electric circuit causing the creation of an electric current towards the surface of more positive potential, causing an excess positive charge to be formed in said cooled melt.

52. The method of claims 50 or 51 wherein an electrical load is inserted in the existing electric circuit connected to the surface of more positive potential, and the voltage in the electric circuit including the anode, the cathode, and the direct current voltage source is regulated so as to create an electrical current from the surface of more positive potential towards said cooled melt with the created positive charge that in the existing electric circuit from said cooled melt having an excess positive charge by which said excess positive charge is neutralized and the electric load for the performance of work consumes the electric power stored as the result of the creation of said excess positive charge.

53. A method of producing a single phase vitreous material from a melt of glass-forming multi-component feed mix which comprises the steps of:

(a) preparing a single phase melt in which there are mobile cations from a glass forming feed mix, components of which feed mix are chemical compounds selected from the group consisting of a chemical compound which includes a univalent metal which in the melt is a mobile cation, a chemical compound including a divalent metal which in the melt is a mobile cation, and mixtures thereof, and chemical compounds selected from the group consisting of a chemical compound which includes a trivalent metal, a chemical compound which includes a metal with a valence higher than three (3), and mixtures thereof, (b) passing said melt in contacting relationship with and sequentially between devices made of low electrical resistance material from device to device, said devices in and completing with the melt and a direct current voltage source an electric circuit in which circuit there is a said device serving as an anode and there is a said device serving as the cathode, and simultaneously placing said melt in contacting relationship with a device made from low electrical resistance material and which serves as a cathode, there also being a device made of low electrical resistance material and which serves as an anode, said anode separated from said melt by a medium which is inert with respect to the melt, and thereby said melt and said medium complete the electric circuit including said devices, said melt, said medium, and a direct current voltage source;

(c) regulating a voltage in the electric circuit including the anode in contact with said melt so that the direct current created in this electric circuit is passed through this melt, and impressing a voltage in the electric circuit including the anode separated from this same melt by the medium which is inert with respect to this same melt to create an electrostatic field between the anode and cathode in this electric circuit, so that the direct current created is passed through the cathode, the anode, said medium, this same melt;

whereby the concentration of said mobile cations in said melt is lowered simultaneously in said electric circuit which includes the anode in contact with the melt and in the electric circuit that includes the anode not in contact with the melt with reduction on the cathode of the metals of the same kind as the mobile cations; and (d) cooling said melt which has the lowered concentration of said mobile cations to produce the material as a structural article.

54. The method of claim 53 wherein the glass forming feed mix melt having a lowered concentration of said mobile cations is cooled in the range of the temperatures of crystallization of this melt at a rate so as to obtain a material from this melt in the amorphous state, this material being in the form of a structural article.

55. The method of claim 53 wherein the melt of the glass forming feed mix having a lowered concentration of said mobile cations is maintained in the range of the temperatures of crystallization of this melt in such a way so as to obtain a material from this melt in the crystalline state, this material being in the form of a structural article.

56. The method of claim 53 wherein said components are in the form of compounds selected from the group consisting of oxides, fluorides, bromides, carbonates, sulfates, nitrates, phosphates, and mixtures thereof.

57. The method of claim 53 wherein said components in the form of compounds selected from the group consisting of carbonates, sulfates, nitrates, phosphates, and mixtures thereof are transformed in step (a) into components of the feed mix.

58. The method of claim 53 wherein said components comprise the chemical compound the carbonate $Na_2CO_3$ which in step (a) is transformed into the starting component $Na_2O$ which includes the univalent metal sodium and the chemical compound the oxide $SiO_2$ which includes metal silicon with a valence higher than three (3).

59. The method of claim 53 wherein said components comprise the chemical compound $Na_2CO_3$ and the chemical compound $SiO_2$ and in which the concentration of the cations of the univalent metal sodium (Na) is lowered in order to obtain a single phase material of fused oxide of the higher valent metal silicon (Si) having a valence higher than three (3) in the form of quartz glass ($SiO_2$).

60. The method of claim 53 wherein in a furnace prepared for lowering the concentration of said mobile cations in the melt of the glass forming feed mix which is passed in a contacting relationship with and sequentially between devices from device to device, the temperature is maintained above the vitrification temperature of this melt at least where this melt is in contacting relationship with at least one of the devices that serves as the anode, and for this same melt which is passed in contacting relationship with the cathode which is in the same electric circuit with the anode separated from this melt by the medium inert with respect to this melt, the temperature and the voltage are regulated to create an effective electric current in this electric circuit so as not to cause an electrical arc breakdown in said medium either between the anode and the materials of the furnace or between the anode and the cathode in direct contact with said medium.

61. The method of claim 60 wherein for substantial lowering of the concentration of said mobile cations, the temperature in said furnace is practiced above the vitrification temperature of the glass forming feed mix melt placed into this furnace for both the melt which is passed in a contacting relationship with and sequentially between devices from device to device, and for this same melt which is passed in a contacting relationship with the cathode which is in the same electric circuit with the anode separated from this melt by said medium inert with respect to this melt.

62. The method of claim 53 wherein the material which serves as the cathode is the metal being reduced on the cathode.

63. The method of claim 53 wherein the low electric resistance material which serves as the cathode dissolves metals being reduced on the cathode.

64. The method of claim 63 wherein the low electric resistance material that serves as the cathode comprises tin.

65. The method of claim 53 wherein to implement steps (a), (b), (c), and (d), the method and equipment for the float glass process is used, and for step (c), a furnace which includes a device with liquid metal and a device for transferring the float glass melt onto the liquid metal is used, so that the device with liquid metal serves as the cathode simultaneously in the electrical circuit with the anode in contact with this same melt, and in the electrical circuit with the anode separated from this same melt, and the device for transferring the float glass melt is made from low electrical resistance material, and serves as the anode in the electrical circuit with the anode in contact with this same melt.

66. The method of claims 53 or 65 wherein a material with a modified surface layer is obtained in said melt which is passed in contacting relationship with the cathode which is in the same electric circuit with the anode separated from this melt by said medium by conducting the present method for a time duration determined so that substantial lowering of the concentration of mobile cations in this melt occurs in the surface layer facing the anode.

67. The method of claim 66 wherein sheet glass with a modified surface layer is produced.

68. The method of claim 67 wherein sheet glass with a modified surface layer is produced from a melt of low temperature eutectics of a glass forming feed mix.

69. The method of claims 53 or 65 wherein said melt is passed from the device that serves as the anode in the electrical circuit with the anode in contact with the melt to and onto the same device that serves as the cathode in both the electrical circuit with the anode in contact with the melt, and in the electric circuit with the anode separated from this same melt.

70. The method of claim 53 or 65 wherein the medium inert with respect to the melt of the glass forming feed mix comprises a gas.

71. The method of claim 70 wherein the gas is an inert gas.

72. The method of claim 70 wherein the gas is nitrogen.

73. The method of claims 53 or 65 wherein the medium is a gas, and the temperature, impressed voltage, and pressure are regulated to create an electrical current in the gaseous medium between the melt of the glass forming feed mix and the anode in such a way as to form in said gaseous medium by means of the ionization of the gaseous medium by the flow of electrons moving from said melt to the anode a glowing electric discharge in the gaseous medium for the establishment of a stable process of lowering the concentration of mobile cations in said melt.

74. The method of claim 60 wherein in the electric circuit with the anode separated by said medium from said melt which is passed in contacting relationship with the cathode of this electric circuit the impressed voltage is effective so that the number of electrons creating the electric current between this anode and this cathode exceed the number of electrons required to neutralize the mobile cations on the cathode, and
 (i) there is another electrical circuit which includes a device made of low electrical resistance material and capable of gaining electrons which is situated between but not in contact with the anode separated from the melt and the cathode in such a way so that the present process is not interrupted and this device is connected by a conductor to a surface of more positive potential which creates an electric current in this thus-formed electric circuit thereby simultaneously creating a positive charge in the melt of the glass forming feed mix, and
 (ii) wherein the melt with positive charge is withdrawn from the electrostatic field and cooled to obtain material in the form of a structural article in the amorphous or crystalline state.

75. The method of claim 53 wherein said melt in step (d) is cooled to a temperature wherein the melt is physically stable for handling and (i) is arranged between devices made from low electrical resistance material adjacent to but spaced apart from said cooled melt which devices are connected to a direct current voltage source and where one device serves as an anode and the other device serves as a cathode, and (k) there also is a device made from low electrical resistance material in contact with said cooled melt connected to a surface of more positive potential, and (l) the voltage is regulated in electric circuit (j) to establish an electric current in this electric circuit causing the creation of an electric current towards the surface of more positive potential, causing an excess positive charge to be formed in said cooled melt.

76. The method of claims 74 or 75 wherein an electrical load is inserted in the existing electric circuit connected to the surface of more positive potential, and the voltage in the electric circuit including the anode, the cathode, and the direct current voltage source is regulated so as to create an electrical current from the surface of more positive potential towards said cooled melt with the created positive charge that in the existing electric circuit from said cooled melt having an excess positive charge by which said excess positive charge is neutralized and the electric load for the performance of work consumes the electric power stored as the result of the creation of said excess positive charge.

77. The method of claim 65 wherein the material which serves as the cathode is the metal being reduced on the cathode.

78. The method of claim 65 wherein the low electric resistance material which serves as the cathode dissolves metals being reduced on the cathode.

79. The method of claim 78 wherein the low electric resistance material that serves as the cathode comprises tin.

80. The method of claims 62, 63, 64, 77, 78, or 79 wherein the low electric resistance material which serves as the cathode and contains metals being reduced at this cathode is removed from the cathode device for subsequently obtaining the reduced metals.

81. The method of claims 80 wherein the obtained metals are oxidized to obtain heat which is recovered.

82. The method of claim 81 wherein the recovered heat is utilized in the present method.

83. The method of claim 82 wherein the recovered heat is utilized in step (a) of the present method.

84. The method of claim 80 wherein the obtained metals are oxidized in order to obtain components which form the glass forming feed mix.

* * * * *